(12) United States Patent
Salzwedel et al.

(10) Patent No.: US 12,377,843 B2
(45) Date of Patent: Aug. 5, 2025

(54) SAFETY SYSTEM FOR VEHICLE LATERAL CONTROL FOR A STEER-BY-WIRE STEERING SYSTEM OF A MOTOR VEHICLE, SAFETY METHOD AND MOTOR VEHICLE

(71) Applicant: Volkswagen Aktiengesellschaft, Wolfsburg (DE)

(72) Inventors: Leon Salzwedel, Braunschweig (DE); Arne Bartels, Wolfsburg (DE); Frank Bärecke, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 34 days.

(21) Appl. No.: 18/463,845

(22) Filed: Sep. 8, 2023

(65) Prior Publication Data
US 2024/0083427 A1 Mar. 14, 2024

(30) Foreign Application Priority Data
Sep. 14, 2022 (DE) .......................... 102022209604.5

(51) Int. Cl.
*B60W 30/10* (2006.01)
*B60W 10/184* (2012.01)
*B60W 10/20* (2006.01)

(52) U.S. Cl.
CPC .......... *B60W 30/10* (2013.01); *B60W 10/184* (2013.01); *B60W 10/20* (2013.01); *B60W 2510/18* (2013.01)

(58) Field of Classification Search
CPC .... B60W 30/10; B60W 10/184; B60W 10/20; B60W 2510/18; B60W 30/045;
(Continued)

(56) References Cited

U.S. PATENT DOCUMENTS 8,165,756 B2 4/2012 Yasui et al.
8,234,045 B2 7/2012 Spadafora et al.
(Continued)

FOREIGN PATENT DOCUMENTS

DE 102006050215 A1 6/2007
DE 102009012857 A1 10/2009
DE 102019007715 A1 5/2021

OTHER PUBLICATIONS

Corresponding EP Application No. 23191537.2. Search Report (Jan. 26, 2024).
(Continued)

*Primary Examiner* — Yi-Kai Wang
(74) *Attorney, Agent, or Firm* — Peter Zura; LOZA & LOZA, LLP

(57) ABSTRACT

A safety system for vehicle lateral control for a Steer-by-Wire steering system of a motor vehicle with a main operating level for transmitting a steering wheel angle to at least one wheel of the motor vehicle, and with a Safety level for transmitting a steering wheel angle to at least one wheel of the motor vehicle. The safety level may be configured to become active if the main operating level fails. An emergency operating level is provided for vehicle lateral control, the emergency operating level being arranged to become active in the event of a failure of the main operating level and/or safety level.

20 Claims, 4 Drawing Sheets

(58) Field of Classification Search
CPC ...... B60W 40/114; B62D 9/005; B62D 5/003; B62D 9/002
USPC .......................................................... 701/43
See application file for complete search history.

(56) References Cited

U.S. PATENT DOCUMENTS

2009/0248250 A1   10/2009  Yasui et al.
2010/0076650 A1*   3/2010  Spadafora .............. B62D 9/005
   701/43
2023/0001929 A1*   1/2023  Lapis .................... B60W 10/20

OTHER PUBLICATIONS

German Priority Application No. 102022209604.5. Examination Report (Feb. 27, 2023).

* cited by examiner

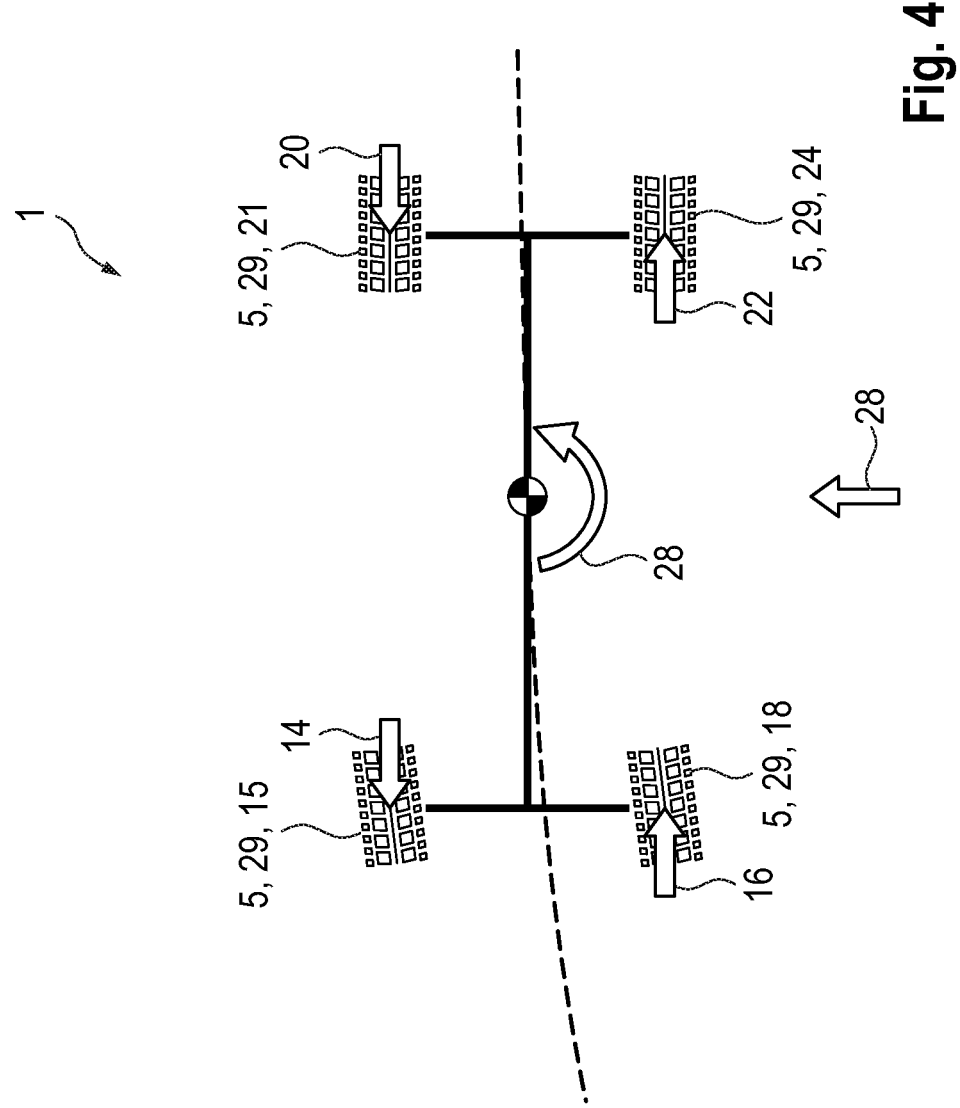

SAFETY SYSTEM FOR VEHICLE LATERAL CONTROL FOR A STEER-BY-WIRE STEERING SYSTEM OF A MOTOR VEHICLE, SAFETY METHOD AND MOTOR VEHICLE

RELATED APPLICATIONS

The present application claims priority to German Pat. App. No. 10 2022 209 604.5 filed Sep. 14, 2022, to Salzwedel et. al, the contents of which is incorporated by reference in its entirety herein.

TECHNICAL FIELD

The present disclosure relates to technologies and techniques relating to a safety system and method having any of the features of the claims, as well as a motor vehicle incorporating features of the safety system and method.

BACKGROUND

Steering systems, for example, a Steer-by-Wire system, influence the wheel steering angle on the front axle for lateral vehicle control in order to impose a lateral movement or yaw movement on the vehicle.

Imposing a yaw moment on a motor vehicle by means of wheel-selective braking interventions and drive torques is well known. It is already used in various driver assistance systems, such as electronic stability control (ESC). Such a system is usually used to influence or correct the steering behavior of the vehicle. The steering of the vehicle is always active, or rather actuated.

Also known is the possibility of steering vehicles with a positive steering roll radius by braking the inside wheels on the front axle. Trucks have such a positive steering roll radius, so this is a goal-oriented solution for trucks. Passenger cars can have both a negative and positive steering roll radius, depending on the design. In the case of a negative steering roll radius, the yaw moment from the actuation of the steering has a compensating effect. In this way, the yaw moment from the wheel-selective braking can be (partially) compensated for or even overcompensated. Lateral control only by wheel-selective braking on the front axle is therefore not always a target-oriented solution.

With Steer-by-Wire, the mechanical connection between the steering wheel/steering column module and the steering gear is broken at the axle and replaced by a redundant data line. The steering column twisted by the driver as a "mechanical fallback level" is no longer required. The overall system (usually only the steering system), which influences lateral dynamics, must therefore meet the ASIL D safety and availability requirement.

To meet this safety requirement, the Steer-by-Wire system should be designed with at least single redundancy according to the current state of the art. This is achieved, for example, by double windings in the motor, double control unit, double electrical power supply and double data communication.

With simple redundancy, after a fault in the Steer-by-Wire system, the motor vehicle must be formally stopped after a short time, since another fault would result in an unsteerable motor vehicle. From a purely statistical point of view, a second failure is not very likely, but it is not impossible, which is why the auxiliary braking effect is still required for the brake in this case, for example. In the event of a fault, a simple redundancy thus leads practically after a short time to a hard stall, i.e., to the motor vehicle coming to a standstill because the steering is no longer functional.

Double redundancy or a second fallback level for a Steer-by-Wire system would therefore be desirable, as the motor vehicle could still continue to drive after a fault, although in the double fault case the requirements for this second fallback level can be significantly reduced compared to the single and zero fault cases. Double redundancy can be achieved, for example, by keeping additional technology on hand, such as a triple control unit or a motor with triple windings (see aircraft technology). However, this is very time-consuming and cost-intensive.

BRIEF SUMMARY

Aspects of the present disclosure are directed to overcoming, at least in part, at least one of the disadvantages described above in safety systems for vehicle lateral control for a Steer-by-Wire steering system of a motor vehicle. Further aspects of the present disclosure are directed to providing a low-cost and simple fallback level in vehicle lateral control for a Steer-by-Wire steering system of a motor vehicle.

In some examples, a safety systems and methods incorporated in a motor vehicle environment are disclosed in the provided claims below. Further features include security systems and methods associated with the safety systems and methods.

In some examples, a safety method is disclosed for vehicle lateral control with a safety system described herein, comprising detecting a failure of the main operating level, and/or detecting a failure of the safety level, and activating the emergency operating level for vehicle lateral control, wherein in the emergency operating level an emergency control unit generates an actual track of the motor vehicle from a target track.

In some examples, safety systems and methods are disclosed for vehicle lateral control of a Steer-by-Wire steering system of a motor vehicle, comprising a main operating level for transmitting a steering wheel angle to at least one wheel of the motor vehicle, and having a safety level for transmitting a steering wheel angle to at least one wheel of the motor vehicle, the safety level being set up to become active in the event of a failure of the main operating level. An emergency operating level may be configured for vehicle lateral control, the emergency operating level being configured to become active in the event of a failure of the main operating level and/or safety level.

BRIEF DESCRIPTION OF THE DRAWINGS

Further advantages, features and details of the present disclosure will be apparent from the following description, in which several embodiments of the present disclosure are described in detail with reference to the drawings. The features mentioned in the claims and in the description may be essential to the present disclosure individually or in any combination. In this regard, the present disclosure is shown in the following figures:

FIG. 4 is a schematic representation of a vehicle lateral control, according to some aspects of the present disclosure.

DETAILED DESCRIPTION

Figure 1:
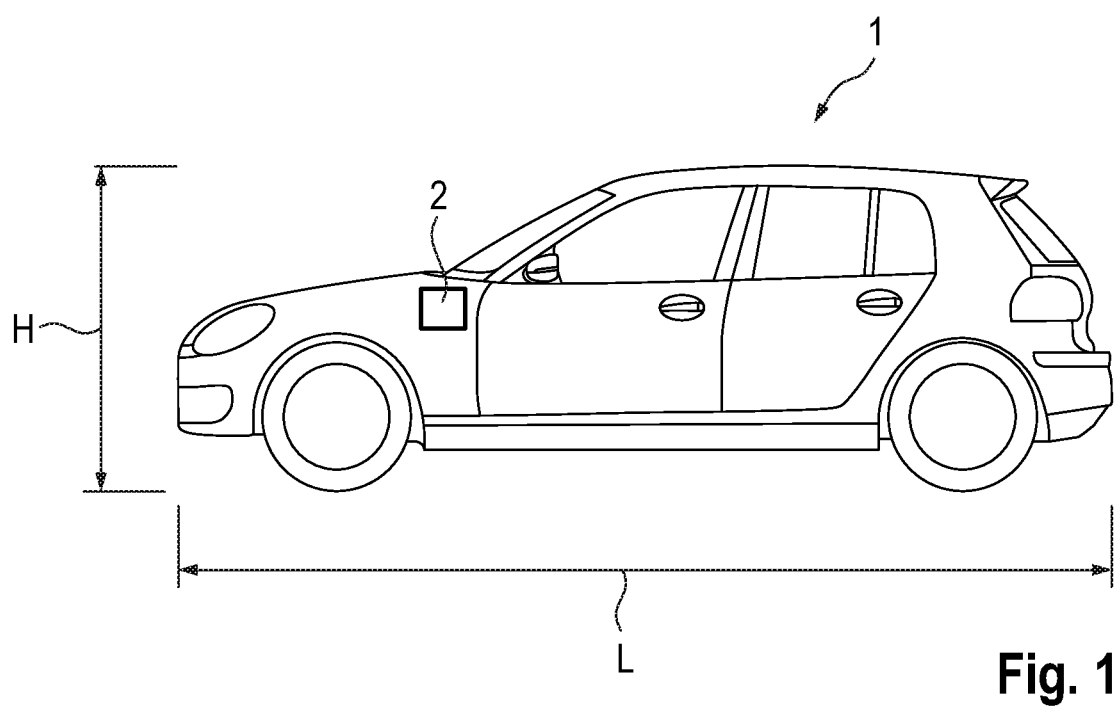
FIG. 1 is a schematic representation of a motor vehicle with a safety system, according to some aspects of the present disclosure.

As disclosed herein, a main level and a safety level may be configured as a redundant system, i.e., they have a similar or identical structure. Both the main level and the safety level each may include a control unit, a steering wheel angle sensor, and at least one wheel steering angle actuator to perform vehicle lateral control. Vehicle lateral control is the lateral control of a motor vehicle in the case of steering, and/or also in the case of emergency braking due to the action of a driving assistant, or similar. The longitudinal forces and lateral forces impose a yaw moment on the motor vehicle around the vertical axis, which in turn causes the vehicle to steer, i.e., to maintain its track. A failure, such as a failure of the main level and the safety level, is understood in the present context to mean that at least one safety-relevant component of the wheel steering angle actuator of the respective level fails. Thus, if at least one wheel steering angle actuator and/or the control unit fail, the respective level below it is activated.

The safety level may thus be activated if at least one of the components wheel angle actuators and/or control unit of the main level fails. If one of the components in the safety level then fails, the emergency operating level is activated. The emergency operating level then accesses the data from the steering angle sensor of the main level or the safety level in order to be able to ensure vehicle lateral control. Advantageously, the emergency level provides a further fallback level to prevent the vehicle from coming to a standstill due to faulty steering. Furthermore, the emergency level in can advantageously access the existing system and thus also be integrated into the already existing system.

Within the scope of the present disclosure, it may be advantageous in some examples that the emergency operating level is set up to generate an actual track from an input variable of the target track.

Here, the input variable of the emergency operating level correlates with the steering wheel angle and corresponds to the target vehicle response, i.e., the response that should be executed by the motor vehicle. A change in the steering wheel angle generates a new input variable for the target track, whereupon the emergency operating level generates a new actual track. It is therefore possible to react quickly to a change in the target track in order to generate a new actual track in the safety system.

Within the scope of the present disclosure, it is contemplated that an emergency operating level may be configured, for example, via an emergency control unit, to calculate a first braking force or a first driving force for a first wheel of the motor vehicle and/or a second braking force or a second driving force for a second wheel of the motor vehicle and/or a third braking force or third driving force for a third wheel and/or a fourth braking force or fourth driving force for a fourth wheel of the motor vehicle from an input variable of the target track.

In some examples, the safety system advantageously uses wheel-selective braking and drive torques to control vehicle lateral and yaw motion in the event of a steering system failure. The longitudinal forces or lateral forces impose a yaw moment on the motor vehicle around the vertical axis, which in turn causes the vehicle to steer. It is also contemplated that the emergency control unit may calculate a braking force or driving force for only one wheel or calculates this for all wheels. Further, the emergency control unit may calculate a driving force for a first wheel and a third wheel of the motor vehicle and a braking force for a second wheel and a fourth wheel of the motor vehicle. The possibility of wheel-selective intervention in terms of imposing a braking force and/or driving force allows fine-tuning of the steering movement and optimization of the yaw moment. This has a positive effect on the stabilization of the motor vehicle.

In some examples, a vehicle model, a model for calculating target braking or driving forces, and a chassis model for calculating the first braking force or first driving force for a first wheel of the motor vehicle and/or a second braking force or second one driving force for a second wheel of the motor vehicle and/or a third braking force or third driving force for a third wheel and/or a fourth braking force or fourth driving force for a fourth wheel of the motor vehicle may be stored in an emergency control unit of the emergency operating level.

The stored vehicle model can mainly include data about the respective vehicle, such as wheelbase, length and height of the motor vehicle, or other dimensions that might be needed to calculate the braking and driving forces.

Furthermore, due to the model for calculating the yaw moment, such as the yaw moment as a function of the vehicle model, can be calculated more easily and thus more simply and accurately. By storing the chassis model, more accurate calculations of braking forces or drive forces can be performed. The chassis model primarily comprises data on the type of drive, i.e., whether the vehicle has front-wheel drive or rear-wheel drive, or whether it has all-wheel drive or single-wheel drive. Furthermore, the chassis model can pass on data from the wheels, especially data on counter-steering of the wheels when braking forces or drive forces are applied, i.e., a disturbance yaw moment, to the model for calculating the yaw moment. The combination of the individual models increases the accuracy of the calculations and improves the safety of the motor vehicle even in emergency operation. Furthermore, an accurate calculation optimizes driving comfort, as the wheels can be optimally controlled.

Regarding safety methods and processes, vehicle lateral control is the lateral control of a motor vehicle in the case of steering, or also in the case of emergency braking due to the action of a driving assistant, or similar. The vehicle's lateral control is particularly relevant when cornering. The vehicle's transverse control, i.e., the applied longitudinal forces and lateral forces, imparts a yaw moment to the motor vehicle around the vertical axis. This in turn causes the vehicle control, which means that the lane is maintained. A failure, in particular a failure of the main level and the safety level, is understood in the present context as the failure of at least one safety-relevant component of the steering system of the respective level. Thus, if the at least one wheel steering angle actuator and/or the control unit fail, the respective level below it is activated to maintain safety.

The safety level is thus activated if at least one of the components wheel angle actuators and/or control unit of the main level fails. If one of the components in the safety level then fails, the emergency operating level is activated. The emergency operating level is designed to detect when the safety level fails. It would also be conceivable for the safety level to activate the emergency operating level in the event of a failure. The emergency operating level then accesses the data from the steering angle sensor of the main level or the safety level in order to be able to ensure vehicle lateral control. Advantageously, the emergency level provides a further fallback level to prevent the vehicle from coming to a standstill due to faulty steering. Furthermore, the emergency level can advantageously access the existing system and thus also be integrated into the already existing system. This is a simple way to increase the safety of the motor vehicle in the event of a steering failure.

According to the present disclosure, it is contemplated that the emergency control unit generates the actual track from an input variable of the desired track, wherein at least a first braking force or first driving force for a first wheel of the motor vehicle and/or a second braking force or a second driving force for a second wheel of the motor vehicle and/or a third braking force or third driving force for a third wheel and/or a fourth braking force or fourth driving force for a fourth wheel of the motor vehicle is calculated by the emergency control unit.

Here, the input variable of the emergency operating level correlates with the steering wheel angle and corresponds to the target vehicle response. A change in the steering wheel angle generates a new input variable for the target track, whereupon the emergency operating level generates a new track. It is therefore possible to react quickly to a change in the target track in order to generate a new actual track for the safety system. Thus, the input variable maps the vehicle response.

It is also contemplated in the present disclosure that a vehicle model may be stored in the emergency control unit, wherein a target yaw moment of the motor vehicle is determined from the input variable by means of the vehicle model, and wherein a first braking force or first driving force for a first wheel of the motor vehicle and/or a second braking force or a second driving force for a second wheel of the motor vehicle and/or a third braking force or third driving force for a third wheel and/or a fourth braking force or fourth driving force for a fourth wheel of the motor vehicle is calculated from the target yaw moment.

The stored vehicle model can mainly include data about the respective vehicle, such as wheelbase, length and height of the motor vehicle, or other dimensions that might be needed to calculate the braking and driving forces.

The yaw rate (also yaw speed) refers to the angular velocity of a vehicle's rotation about its vertical axis. The deposit of the vehicle model allows an improved and more accurate calculation of the braking and driving forces.

In some examples, it is optionally possible for a chassis model to be stored on the emergency control unit, wherein a disturbance yaw moment is determined by means of the chassis model from the first braking force or the first driving force set at the first wheel of the motor vehicle and/or the second braking force or the second driving force set at the second wheel of the motor vehicle and/or the third braking force or the third driving force set at the third wheel of the motor vehicle and/or the fourth braking force or the fourth driving force set at the fourth wheel of the motor vehicle.

By storing the chassis model, more accurate calculations of braking forces or drive forces can be performed. The chassis model primarily comprises data on the type of drive, i.e., whether the vehicle is front-wheel drive or rear-wheel drive, or whether it is all-wheel drive or single-wheel drive. Furthermore, the chassis model can determine data from the wheels, especially data about counter-steering of the wheels when braking forces or drive forces are applied, i.e., a disturbance yaw moment, and feed this back to the emergency control unit.

In this example, the disturbance yaw moment may passed on to the model for calculating the target braking and/or drive forces. The model for calculating the actual yaw moment can take into account the disturbance yaw moment and the target yaw moment to calculate the braking and driving forces for the respective individual wheels or all wheels in an iterative process to generate the actual toe. This increases safety and driving comfort.

In some examples, the chassis model takes into account that the motor vehicle has an independent wheel drive or a front axle drive or a rear axle drive or an all-wheel drive. This makes it possible to specify the drive and braking torques wheel-selectively or via a differential in order to generate the actual track as accurately as possible using the drive and braking forces. This, in turn, increases safety and driving comfort.

In some examples, a model for calculating target braking and/or drive forces may be stored on the emergency control unit, wherein the model for calculating desired braking and/or driving forces for determining the desired braking and/or driving forces superimposes the desired yaw moment from the vehicle model and the disturbance yaw moment from the chassis model for calculating the first braking force or first driving force for a first wheel of the motor vehicle and/or a second braking force or second driving force for a second wheel of the motor vehicle and/or a third braking force or third driving force for a third wheel and/or a fourth braking force or fourth driving force for a fourth wheel of the motor vehicle.

By superimposing the target yaw moment with the disturbance yaw moment, the influences of the counter-steering of the wheels can be included in order to optimally generate the actual toe. This allows the actual track to be flexibly adjusted. Fast adaptation of the actual toe to the target yaw torques generated from the input variables and the disturbance yaw torque enables an increase in the safety of the safety system.

In some examples, it may be advantageous that the target track is generated via a driving system, whereby the input variable of the emergency operating level correlates with the target track. The driving system here may primarily be a system for automated or autonomous driving. The main advantage of using a driving system in the safety procedure is that the driving system can access existing driving assistants or data of the vehicle in order to be able to calculate the braking and driving forces. Access to all the data recorded in the motor vehicle enables precise calculation of the target track and the actual track. This increases the stabilization of the motor vehicle and the safety of the motor vehicle in general.

In some examples, the driving system may include an anticipatory control unit and a compensatory control unit for generating the input variable from the target track, wherein the compensatory control unit may take into account the influence of a disturbance on the actual track when calculating the input variable. Nevertheless, the disturbance can already be taken into account or estimated by the anticipatory control unit.

"Anticipatory" is understood herein as anticipatory, which means that the anticipatory control unit is anticipatory. For example, in the case of an upcoming curve, the steering angle will change in advance, so that the anticipatory control unit can pick it up in advance in order to obtain the input variable of the target track from this target vehicle reaction, for example, a steering angle, in order to calculate the actual track from it.

The compensatory control unit supports the anticipatory control unit in generating the input variable from the target vehicle reaction by including disturbances that act on the vehicle from outside in the calculation. The input variable is thus a superposition of an anticipated and compensated target track. The disturbances that the compensatory control unit compensates for can be, for example, various road conditions that can have an influence on the track of the motor vehicle and negatively affect the actual track. These road conditions can be, for example, the slope of the road, a balling of the asphalt, ruts, or crosswinds.

For anticipatory control, the motor vehicle may have a sensor, in particular a camera and/or a lidar sensor and/or a radar sensor. Furthermore, it is conceivable that the driving system can access the components of the main level and/or the safety level that are still functioning. For example, the input variable can come from the steering angle sensor of the main level, even if its wheel steering angle actuators are defective and the safety level has failed. This increases the accuracy of vehicle lateral control due to a more accurate calculation of braking and drive forces.

In some examples, the first braking force and/or the second braking force and/or the third braking force and/or the fourth braking force is applied by a continuous brake application or a brake pressure pulsing. This enables precise and adapted braking intervention for vehicle lateral control and increases ride comfort.

Furthermore, it is possible that the driving forces can be applied via an open or lockable differential, thus synthetically increasing the braking or driving force that can be applied on one side.

Aspects of the present disclosure may also be embodied in a motor vehicle comprising a safety system described herein for carrying out a safety method described above. This means that a higher yaw moment can be generated even at low adhesion coefficients.

Turning to FIG. 1, the illustration shows a motor vehicle 1 with a safety system 2 for lateral vehicle control. The safety system 2 for vehicle lateral control for a Steer-by-Wire steering system of a motor vehicle 1 is shown schematically in FIG. 2. It has a main operating level 3 for transmitting a steering wheel angle to at least one wheel 5 of the motor vehicle 1, and with a safety level 4 for transmitting a steering wheel angle to at least one wheel 5 of the motor vehicle 1. Here, the safety level 4 is set up to become active in the event of a failure of the main operating level 3. To provide another fallback level, an emergency operating level 6 is provided for vehicle lateral control. The emergency operating level 6 becomes active as soon as there is a failure of the main operating level 3 and/or safety level 4.

In general, the emergency operating level 6 is set up to generate an actual track 9 from an input variable 7 of the target track 8. It adopts this, in case of an emergency operation of the safety system 2, i.e., in case of the failure of the main operation level 3 and/or the safety level 4.

The motor vehicle 1 shown may be configured with an individual wheel drive system, which means that each wheel 5 can be controlled individually to provide lateral vehicle control. For this reason, the emergency operating level 6 has an emergency control unit 10 for the calculation 150 of the actual track 9. In this case, the emergency control unit 10 is set up to calculate a first braking force 13 or a first driving force 14 for a first wheel 5, 15 of the motor vehicle 1 and/or a second braking force 16 or a second driving force 17 for a second wheel 5, 18 of the motor vehicle 1 and/or a third braking force 19 or third driving force 20 for a third wheel 5, 21 and/or a fourth braking force 22 or fourth driving force 23 for a fourth wheel 5, 24 of the motor vehicle 1 from the input variable 7 of the target track 8. For this purpose, a vehicle model 25, a model for calculating target braking and drive forces 26 and a chassis model 27 are stored on the emergency control unit 10 of the emergency operating level 6. Accordingly, depending on the dimensions, such as length L and height H, from the vehicle model 25 and the drive type, or the current counter-steering behavior of the individual wheels 5, 15, 18, 21, 24, from the chassis model 27, the emergency operating level 6 can calculate the respective braking forces 11 and driving forces 12 by means of the model for calculating target braking and driving forces 26 in order to generate the is lane 9.

Figure 2:
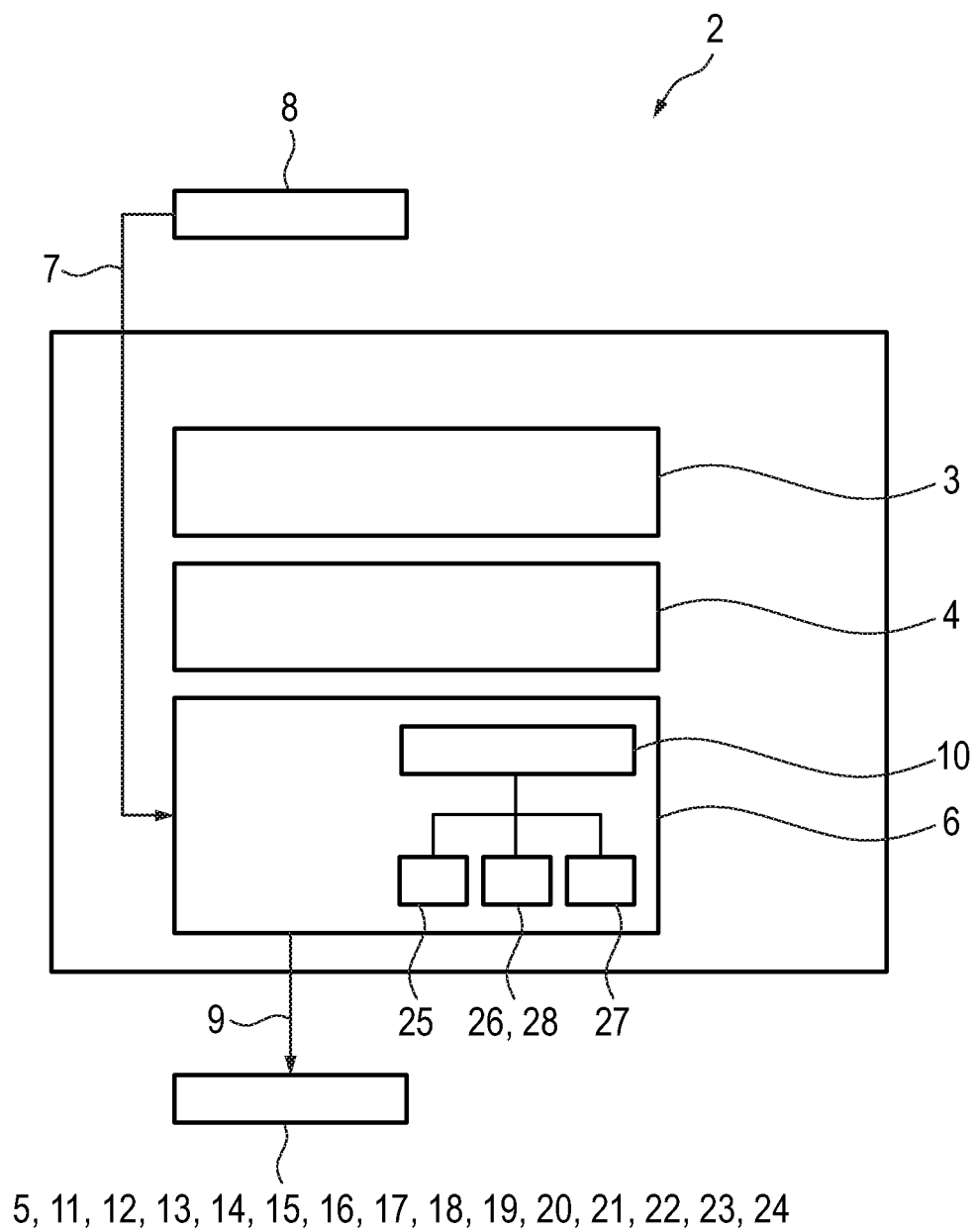
FIG. 2 is a schematic representation of a safety system, according to some aspects of the present disclosure.
Figure 3:
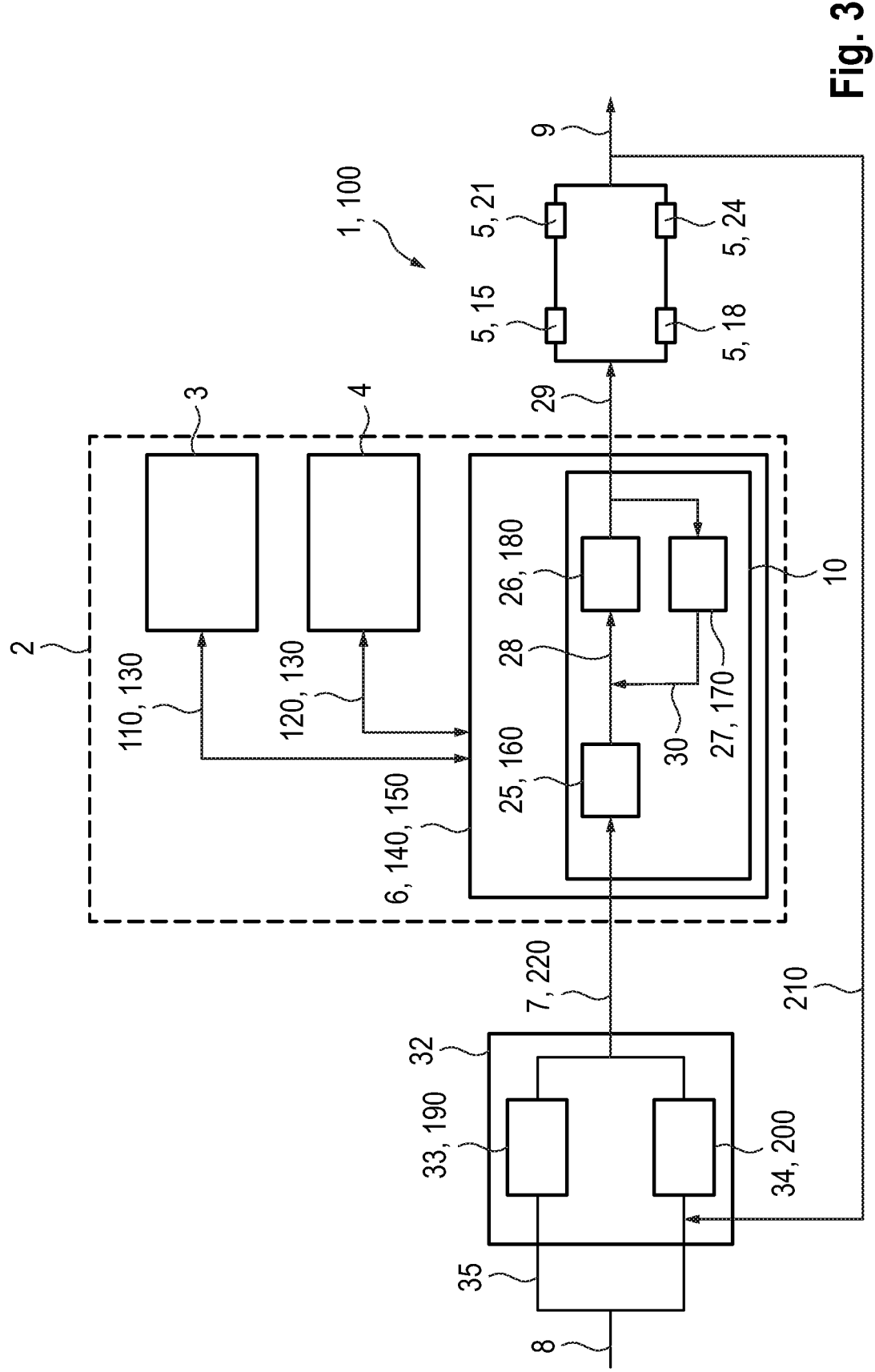
FIG. 3 is a schematic representation of a safety procedure, according to some aspects of the present disclosure.

In FIG. 3, the safety method 100 for vehicle lateral control is shown utilizing a safety system 2 according to FIG. 2. This includes the following steps:

Detecting 110 a failure of the main operating level 3, and/or

Detecting 120 of a failure of the safety level 4,

Activating 130 the emergency operating level 6 for vehicle lateral control, wherein in the emergency operating level 6 an emergency control unit 10 generates an actual lane 9 of the motor vehicle 1 from a target lane 8.

In the present embodiment, the system is a safety system 2 for an automated or autonomously driving motor vehicle 1 with a driving system 32, wherein the target lane 8 is generated 140 by means of a driving system 32, wherein the input variable 7 of the emergency operating level 6 correlates with the target lane 8. In the depicted system, the task of the driving system can also be performed by the driver through his anticipatory and compensatory abilities.

Provided that the emergency operating level 6 is activated, 140 the emergency control unit 10 generates the actual track 9 from the input variable of the target track 8. Thereby, at least a first braking force 13 or first driving force 14 for a first wheel 15 of the motor vehicle 1 and/or a second braking force 16 or second one driving force 12 for a second wheel 18 of the motor vehicle 1 and/or a third braking force 19 or third driving force 20 for a third wheel 21 and/or a fourth braking force 22 or fourth driving force 23 for a fourth wheel 24 of the motor vehicle 1 are calculated 150 by the emergency control unit 10.

For this calculation 150 of the braking forces 11 and driving forces 12 of the individual wheels 5, 15, 18, 21, 24 of the motor vehicle 1, the emergency control unit 10 accesses the stored vehicle model 25, a target yaw moment 28 of the motor vehicle 1 being determined 160 from the input variable 7 by means of the vehicle model 25. In this case, a first braking force 13 or first driving force 14 for a first wheel 15 of the motor vehicle 1 and/or a second braking force 16 or a second driving force 17 for a second wheel 18 of the motor vehicle 1 and/or a third braking force 19 or third driving force 20 for a third wheel 21 and/or a fourth braking force 22 or fourth driving force 23 for a fourth wheel 24 of the motor vehicle 1 are calculated 150 from the target yaw moment 28.

Furthermore, the emergency control unit 10 accesses a stored chassis model 27, wherein a disturbance yaw moment 30 is determined by means of the chassis model 27 from the first braking force 13 or the first driving force 14 set at the first wheel 15 of the motor vehicle 1 and/or the second braking force 16 or the second driving force 17 set at the second wheel 18 of the motor vehicle 1 and/or the third braking force 19 or the third driving force 20 set at the third wheel 21 of the motor vehicle 1 and/or the fourth braking force 22 or the fourth driving force 23 set at the fourth wheel 24 of the motor vehicle 1.

In order to further increase safety or to further stabilize vehicle lateral control by means of the safety system 2, the emergency control unit 10 accesses the stored model for calculating target braking and drive forces 26. Thereby, the model for calculating 150 target braking and/or driving forces 26 for determining 180 the target braking and/or driving forces 29 uses the target yaw moment 28 from the vehicle model 25 and the disturbance yaw moment 30 from the chassis model 27 for calculating the first braking force 13 or first driving force 14 for a first wheel 15 of the motor vehicle 1 and/or a second braking force 16 or a second driving force 12 for a second wheel 18 of the motor vehicle 1 and/or a third braking force 19 or third driving force 20 for a third wheel 21 and/or a fourth braking force 22 or fourth driving force 23 for a fourth wheel 24 of the motor vehicle 1 are superimposed. The actual track 9 is thus calculated iteratively and contains information from a target vehicle response 35, for example, the set steering angle, and the disturbances, thereby the drive forces 12 and brake forces 11 are calculated so accurately that the actual track 9 is calculated with a small error.

In order to be able to guarantee the input variable 7 to the emergency operating level 6 of the safety system 2, the driving system 32 has an anticipatory control unit 33 and a compensatory control unit 34 for generating the input variable 7 from the target track 8. Here, the compensatory control unit 34 takes into account the influence of a disturbance on the actual track 9 when calculating the input variable 7. For this purpose, the anticipatory control unit 33 anticipates a target vehicle reaction 35, which is compensated 200 by the compensatory control unit 34 by receiving a disturbance variable 36 from the actual track 9. In this regard, the compensatory control unit 34 compensates 200 primarily for disturbances 36 due to disturbances, such as crosswinds or road conditions, or the like.

FIG. 4 shows a schematic representation of a vehicle lateral control during cornering. In this case, the emergency operating level 6 has received a steering angle as a target vehicle response 35, and the emergency control unit 10 has calculated the braking forces 11 and driving forces 12 from the stored data of the vehicle model 25, the chassis model 27, and the model for calculating target braking and driving forces 26 for cornering in such a way that stable target braking and/or driving forces 29 are obtained. For this illustrated turn, this means that the emergency control unit 10 has calculated a first driving force 14 for the first wheel 15 and a third driving force 20 for the third wheel 21, as well as a second braking force 16 for the second wheel 18 and a fourth braking force 22 for the fourth wheel 24. The first and third drive forces 14, 20 can be the same or different, and the same applies to the second and fourth brake forces 16, 22. The braking force 11 is applied by means of a continuous braking action.

LIST OF REFERENCE SIGNS

1 Motor vehicle
2 Safety system
3 Main operating level
4 Safety level
5 Wheel
6 Emergency operating level
7 Input variable
8 Target track
9 Actual track
10 Emergency control unit
11 Braking power
12 Driving force
13 First braking force
14 First driving force
15 First wheel
16 Second braking force
17 Second driving force
18 Second wheel
19 Third braking force
20 Third driving force
21 Third wheel
22 Fourth braking force
23 Fourth driving force
24 Fourth wheel
25 Vehicle model
26 Model for calculating target braking and driving forces
27 Chassis model
28 Target yaw moment
29 Target braking and/or driving forces
30 Disturbance yaw moment
31 Single drive
32 Driving system
33 Anticipatory control unit
34 Compensatory control unit
35 Target vehicle response
36 Disturbance variable
100 Safety procedures
110 Detecting a failure of the main operating level
120 Detecting a failure of the safety level
130 Activating
140 Generation
150 Calculation
160 Conversion of steering angle/target track into target yaw moment
170 Determining the disturbance yaw moment
180 Determining the target braking and/or driving forces
190 Anticipating the target vehicle response
200 Compensating for the target vehicle response
210 Obtaining the disturbance variable
220 Calculation of the input variable
L Length
H Height

The invention claimed is:

1. A system for motor vehicle lateral control, comprising:
a Steer-by-Wire steering system of the motor vehicle;
an emergency control unit, operatively coupled to the Steer-by-Wire steering system;
a safety system, operatively coupled to the Steer-by-Wire steering system, wherein the safety system and emergency control unit are configured to:
transmit a steering wheel angle at a main operating level to at least one wheel of the motor vehicle,
transmit a steering wheel angle at a safety level to at least one wheel of the motor vehicle, wherein the safety level is configured to become active in the event of a failure of the main operating level; and
activate an emergency operating level for vehicle lateral control, the emergency operating level being configured become activated in the event of a failure of the main operating level and/or safety level.

2. The safety system according to claim 1, wherein the emergency operating level is configured to generate an actual track from an input variable of a target track.

3. The safety system according to claim 1, further comprising a driving system for generating a target lane, using an input variable of the emergency operating level that is correlated with the target lane.

4. The safety system according to claim 3, wherein the driving system comprises an anticipatory control unit and a compensatory control unit for processing the input variable from the target track, wherein the compensatory control unit processes a disturbance variable caused by a disturbance on the actual track during the processing of the input parameter.

5. The safety system according to claim 1, wherein the emergency control unit is configured to configure the emergency operating level by calculating, from an input variable of a set track:
   (i) a first braking force or a first driving force for a first wheel of the motor vehicle,
   (ii) a second braking force or a second driving force for a second wheel of the motor vehicle,
   (iii) a third braking force or third driving force for a third wheel, and/or
   (iv) a fourth braking force or fourth driving force for a fourth wheel of the motor vehicle.

6. The safety system according to claim 1, wherein the emergency control unit is configured to configure an actual track from an input variable of a target track, wherein the emergency control unit is further configured to calculate
   (i) at least a first braking force or a first driving force for a first wheel of the motor vehicle,
   (ii) a second braking force or a second driving force for a second wheel of the motor vehicle,
   (iii) a third braking force or third driving force for a third wheel, and/or
   (iv) a fourth braking force or fourth driving force for a fourth wheel of the motor vehicle.

7. The safety system according to claim 1, wherein the emergency control unit is configured to store a vehicle model, a model for calculating target braking and/or drive forces, and a chassis model to calculate
   (i) a first braking force or first drive force for a first wheel of the motor vehicle,
   (ii) a second braking force or a second drive force for a second wheel of the motor vehicle,
   (iii) a third braking force or third driving force for a third wheel, and/or
   (iv) a fourth braking force or fourth driving force for a fourth wheel of the motor vehicle.

8. A safety method for a vehicle traversing with a safety system, comprising:
   transmitting a steering wheel angle at a main operating level to at least one wheel of the motor vehicle,
   transmitting a steering wheel angle at a safety level to at least one wheel of the motor vehicle, wherein the safety level is configured to become active in the event of a failure of the main operating level; and
   activating an emergency operating level for vehicle lateral control, the emergency operating level being configured become activated in the event of a failure of the main operating level and/or safety level; and
   generating an actual lane of the motor vehicle from a target lane.

9. The safety method according to claim 8, further comprising generating the actual track from an input variable of the target track, calculating at least one of
   (i) a first braking force or first drive force for a first wheel of the motor vehicle,
   (ii) a second braking force or a second drive force for a second wheel of the motor vehicle,
   (iii) a third braking force or third driving force for a third wheel, and/or
   (iv) a fourth braking force or fourth driving force for a fourth wheel of the motor vehicle.

10. The safety method according to claim 8, further comprising storing a vehicle model in an emergency control unit, wherein a desired yaw moment of the motor vehicle is determined from an input parameter of the vehicle model, and wherein the desired yaw moment is used to calculate at least one of
    (i) a first braking force or first drive force for a first wheel of the motor vehicle,
    (ii) a second braking force or a second drive force for a second wheel of the motor vehicle,
    (iii) a third braking force or third driving force for a third wheel, and/or
    (iv) a fourth braking force or fourth driving force for a fourth wheel of the motor vehicle.

11. The safety method according to claim 8, further comprising storing a chassis model in an emergency control unit, wherein a disturbance yaw moment of the motor vehicle is determined from an input parameter of the chassis model, and wherein the desired chassis moment is used to calculate at least one of
    (i) a first braking force or first drive force for a first wheel of the motor vehicle,
    (ii) a second braking force or a second drive force for a second wheel of the motor vehicle,
    (iii) a third braking force or third driving force for a third wheel, and/or
    (iv) a fourth braking force or fourth driving force for a fourth wheel of the motor vehicle.

12. The safety method according to claim 11, wherein the chassis model comprises data relating to a vehicle drive comprising one of an individual wheel drive, a front axle drive, a rear axle drive, or an all-wheel drive.

13. The safety method according to claim 8, further comprising storing a vehicle model for calculating target braking and/or driving forces, wherein the vehicle model for calculating target braking and/or driving forces is used to overlay a desired yaw moment from the vehicle model and a disturbance yaw moment from a chassis model to calculate
    (i) a first braking force or first drive force for a first wheel of the motor vehicle,
    (ii) a second braking force or a second drive force for a second wheel of the motor vehicle,
    (iii) a third braking force or third driving force for a third wheel, and/or
    (iv) a fourth braking force or fourth driving force for a fourth wheel of the motor vehicle to determine the target braking and/or driving forces.

14. The safety method according to claim 8, further comprising generating a target track via a driving system, and processing an input variable of the emergency operating level with the target track.

15. The safety method according to claim 14, wherein the driving system comprises an anticipatory control unit and a compensatory control unit for processing the input variable from the target track, wherein the compensatory control unit processes a disturbance variable caused by a disturbance on the actual track during the processing of the input parameter.

16. The safety method according to claim 8, further comprising applying a braking force to the motor vehicle by a continuous braking intervention or a braking pressure pulse.

17. A vehicle, comprising:
    a Steer-by-Wire steering system;
    an emergency control unit, operatively coupled to the Steer-by-Wire steering system;
    a safety system, operatively coupled to the Steer-by-Wire steering system, wherein the safety system and emergency control unit are configured to:
        transmit a steering wheel angle at a main operating level to at least one wheel of the motor vehicle, transmit a steering wheel angle at a safety level to at least one wheel of the motor vehicle, wherein the safety level is configured to become active in the event of a failure of the main operating level; and activate an emergency operating level for vehicle lateral control, the emergency operating level being configured become activated in the event of a failure of the main operating level and/or safety level.

18. The vehicle according to claim 17, wherein the emergency operating level is configured to generate an actual track from an input variable of a target track.

19. The vehicle according to claim 17, further comprising a driving system for generating a target lane, using an input variable of the emergency operating level that is correlated with the target lane.

20. The vehicle according to claim 19, wherein the driving system comprises an anticipatory control unit and a compensatory control unit for processing the input variable from the target track, wherein the compensatory control unit processes a disturbance variable caused by a disturbance on the actual track during the processing of the input parameter.

* * * * *